US 6,637,681 B1

(12) United States Patent
Planca et al.

(10) Patent No.: US 6,637,681 B1
(45) Date of Patent: Oct. 28, 2003

(54) SAFETY SYSTEM TO PREVENT THE FUNCTIONING OF A BLENDER OR FOOD PROCESSOR IF THE TOP OF ITS CUP IS NOT IN PLACE

(75) Inventors: Rinaldo Planca, Sao Bernardo do Campo (BR); José Carlos Veneziano, Santana (BR)

(73) Assignee: Arno S.A., Sao Paulo (BR)

( * ) Notice: Subject to any disclaimer, the term of this patent is extended or adjusted under 35 U.S.C. 154(b) by 0 days.

(21) Appl. No.: 09/806,829

(22) PCT Filed: Oct. 2, 1999

(86) PCT No.: PCT/IB99/01617

§ 371 (c)(1),
(2), (4) Date: Apr. 5, 2001

(87) PCT Pub. No.: WO00/19878

PCT Pub. Date: Apr. 13, 2000

(30) Foreign Application Priority Data

Oct. 6, 1998 (BR) .............................................. 9804163
Feb. 5, 1999 (BR) .............................................. 9900486

(51) Int. Cl.⁷ .......................... B02C 18/12; A47J 43/06
(52) U.S. Cl. ...................... 241/37.5; 241/92; 366/207
(58) Field of Search ........................ 99/510, 512, 513; 241/36, 37.5, 92, 282.1, 282.2; 366/206, 601

(56) References Cited

U.S. PATENT DOCUMENTS

| 3,892,365 A | * | 7/1975 | Verdun | 241/92 |
| 4,335,860 A | * | 6/1982 | Grandelet | 241/37.5 |
| 4,373,677 A | | 2/1983 | Kunihiro | |
| 4,396,159 A | * | 8/1983 | Podell | 241/37.5 |
| 4,506,836 A | * | 3/1985 | Williams | 241/37.5 |
| 4,629,131 A | * | 12/1986 | Podell | 241/36 |
| 4,716,823 A | * | 1/1988 | Capdevila | 99/510 |

FOREIGN PATENT DOCUMENTS

| DE | 1 529 275 | 7/1969 |
| EP | 0 025 972 | 4/1981 |
| EP | 0 699 409 | 3/1996 |
| NL | 110380 | 7/1964 |

* cited by examiner

Primary Examiner—W. Donald Bray
(74) Attorney, Agent, or Firm—Browdy and Neimark, P.L.L.C.

(57) ABSTRACT

The invention is related to an electrical appliance from the type blender of food processor, comprising a base including an electric motor, a container able to be removably secured on said base, said container having a cylindrical open top, a food processing tool mounted in the bottom of said container and able to be driven by said motor, a lid able to close said container, means for limiting axial movement of the lid, means for limiting rotational movement of the lid, a safety device including a pin mounted on the container and a switch mounted on the base, the lid including means for actuating the pin to operate the switch in order to enable motor operation when the lid occupies a closed operating position on the container, wherein a locking button is provided on the container, said button being able to actuate a lock able to bear against an abutment or to enter a notch, said notch or said abutment being provide on the lid, to lock the lid on the container in the closed operating position.

12 Claims, 5 Drawing Sheets

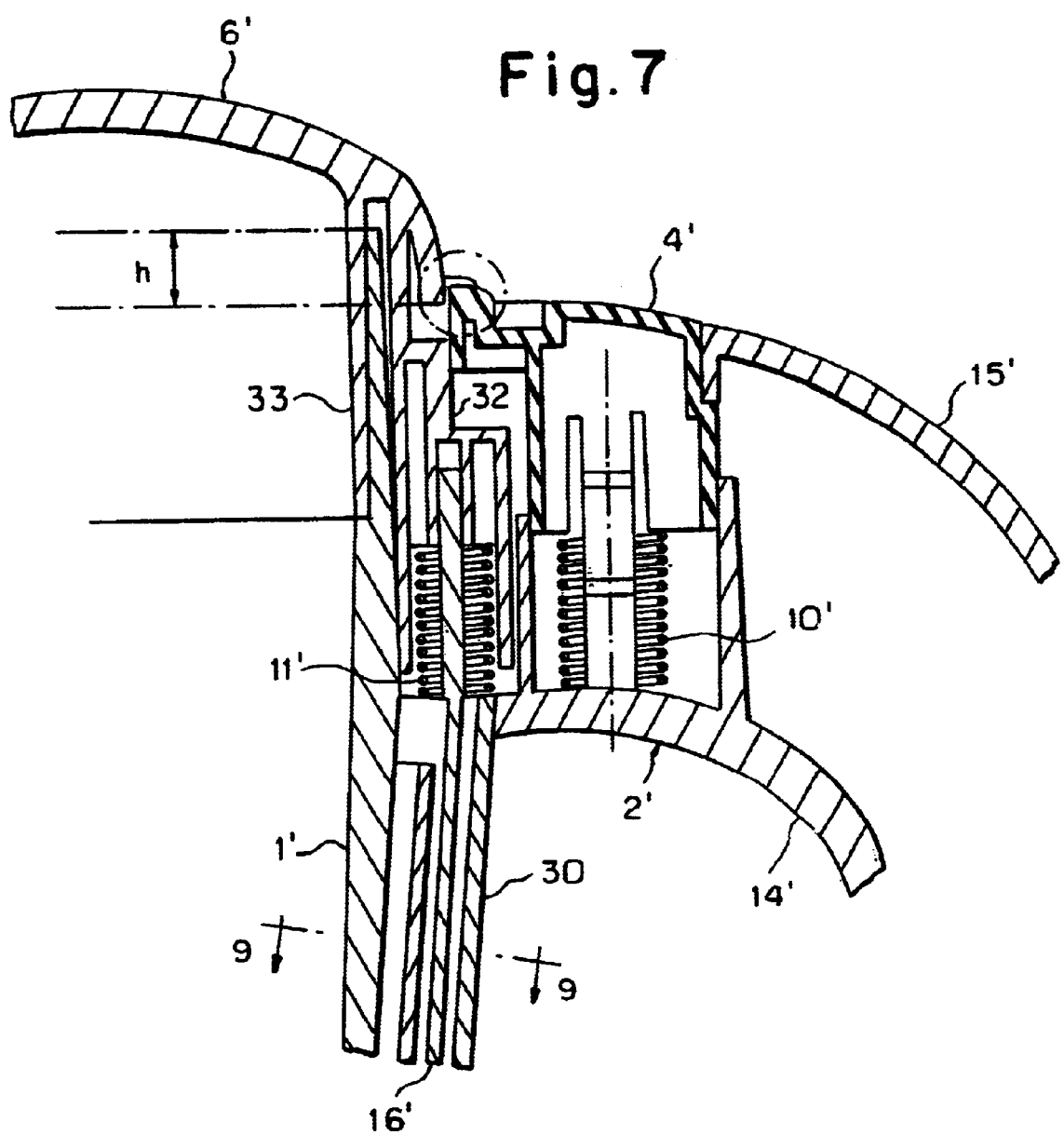
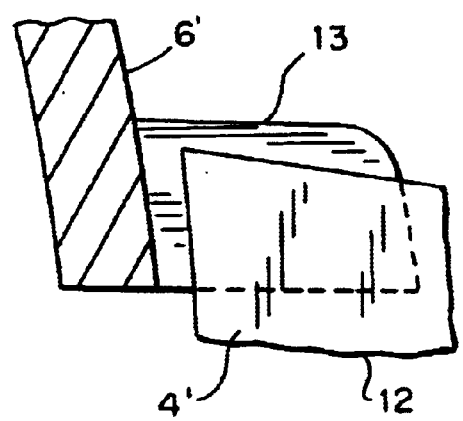

SAFETY SYSTEM TO PREVENT THE FUNCTIONING OF A BLENDER OR FOOD PROCESSOR IF THE TOP OF ITS CUP IS NOT IN PLACE

The present request relates to a safety system for home appliances such as blenders or food processors in order to avoid the user turning on the apparatus without its top in place, as well as placing in the cup any external utensil when the apparatus is on.

The present invention consists of a new layout of a safety system that simultaneously locks the blender's cup lid on the cup, as well as activating the contact pin and, consequently, the electric motor safety switch.

A food appliance comprising a rotating tool mounted in a container removably secured on a motor base, a lid for closing said container and a safety device for controlling operation is known from U.S. Pat. No. 3,892,365. The safety device comprises a pin sliding in a vertical channel of the container. The lid is secured in its closed position by means of anchoring lugs adapted to be inserted under retaining ledges formed with the upper edge of the cup. The lid also comprises a cam able to depress the upper end of the pin when the lid is brought to is closed position by rotation. The lower end of the pin is able to actuate an electric switch provided in the motor base. However, such an apparatus can easily be opened by turning on the lid.

The objective of the present invention is to provide a safety system to prevent the functioning of a blender or food processor if the lid of the container is not in place, allowing a simple and ergonomic construction, and avoiding the preceding drawback.

This objective can be achieved with an electrical appliance from the type blender or food processor, comprising a base including an electric motor, a container able to be removably secured on said base, said container having an cylindrical open top, a processing mounted in the bottom of said container and able to be driven by said motor, a lid able to close said container, means for limiting axial movement of the lid, means for limiting rotational movement of the lid, a safety device including a pin mounted on the container and a switch mounted on the base, the lid including means for actuating the pin to operate the switch in order to enable motor operation when the lid occupies a closed operating position on the container, wherein a locking button is provided on the container, said button being able to actuate a lock able to bear against an abutment or to enter a notch, said notch or said abutment being provided on the lid, to lock the lid on the container in the closed operating position. With the locking button provided on the container, the user is invited to hold the container to actuate the button and hold the lid to open the apparatus.

Advantageously, the button is provided on the upper part of a handle of the container and is moveable according an approximately vertical direction. The user is invited to hold firmly the handle by pushing with his thumb the button.

Preferably to simplify the device the lock and the safety pin are moveable against return springs.

According to an embodiment, the lid comprises projecting horizontal edges able to fit with corresponding edges of the container, stops being provided on lid edges and/or on container edges.

According to another embodiment, the lid and the container comprises screw threading means.

According to a specific embodiment the pin actuating means of the lid comprise a slanted actuating edge able to depress an actuator of the pin when closing the lid and a locking edge able to bear against the lock when the lid occupies the closed operating position on the container.

The present invention will be now described with more details by way of examples, with reference to and as shown in the accompanying drawings, in which:

FIG. 1 is a sectional elevation of an appliance such as a blender comprising a safety device in accordance with a first embodiment of the invention, FIG. 2 is a perspective view of the apparatus lid with its locking components on the apparatus cup, FIG. 3 is a perspective detail of the upper part of the apparatus cup with the safety system's activating components, FIG. 4 is a perspective view of the apparatus lid, showing the location of the projecting edges and its activating lug, FIG. 5 is a front detail of the activating system by the lug of the apparatus lid, with the lid in the "unlocked" position, seen from the interior of the cup, FIG. 6 is a front detail of the activating system by the lug of the apparatus lid, with the lid in the "locked" position, seen from the interior of the cup, FIG. 7 is a sectional elevation of the top of an appliance such as a blender comprising a safety device in accordance with a second embodiment of the invention, FIG. 8 is a enlarged view of a detail of FIG. 7, showing a part of the safety device.

Figure 1:
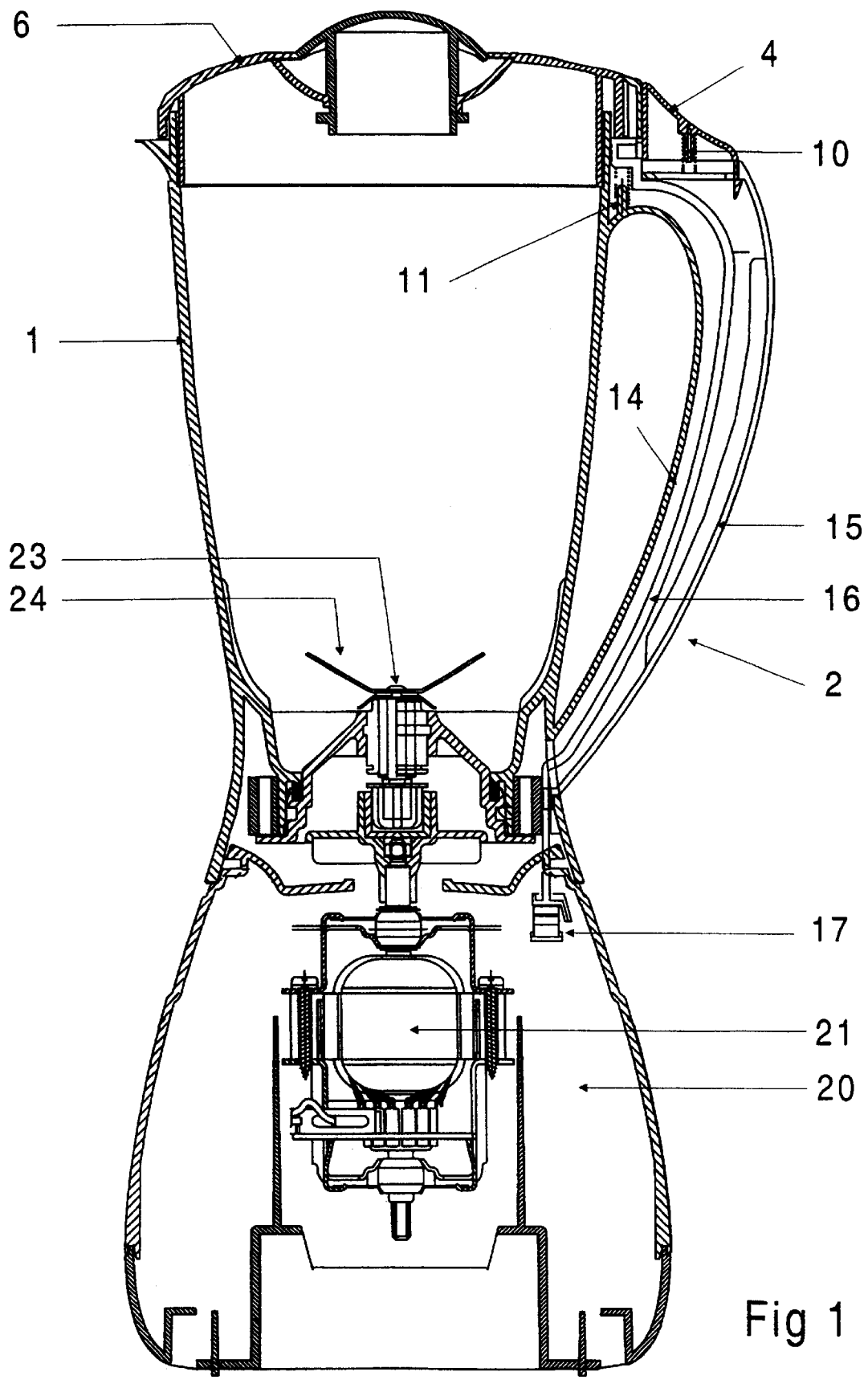

The blender according to the invention shown on FIG. 1 comprises a motor base 20 including an electric motor 21, a container or cup 1 having a cylindrical open top, and also a lid 6 to close the container 1, said container being removably mounted on the motor base. A food processing tool 24 is secured to the upper end of a rotary axle 23 mounted through the bottom of the container 1, the lower end of said axle bearing a coupling able to be driven by the electric motor 21 when the container 1 is mounted on the base 20.

A handle 2 is provided on a side wall of the container 1. The upper and lower ends of the handle 2 are fixed to the container 1. The handle 2 comprises a part 14 formed integral with the container 1 and a cover 15 secured to said part to form a hollow body. An actuating pin 16 mounted against a spring 11 is provided in the hollow handle 2. The lower end of the pin 16 is able to actuate an electric switch 17 provided in the motor base 20. The upper end of the pin 16 is able to be driven by a button 4 provided on the upper curved portion of the handle 2. The button 4 is vertically moveable against a spring 10.

Figure 2:
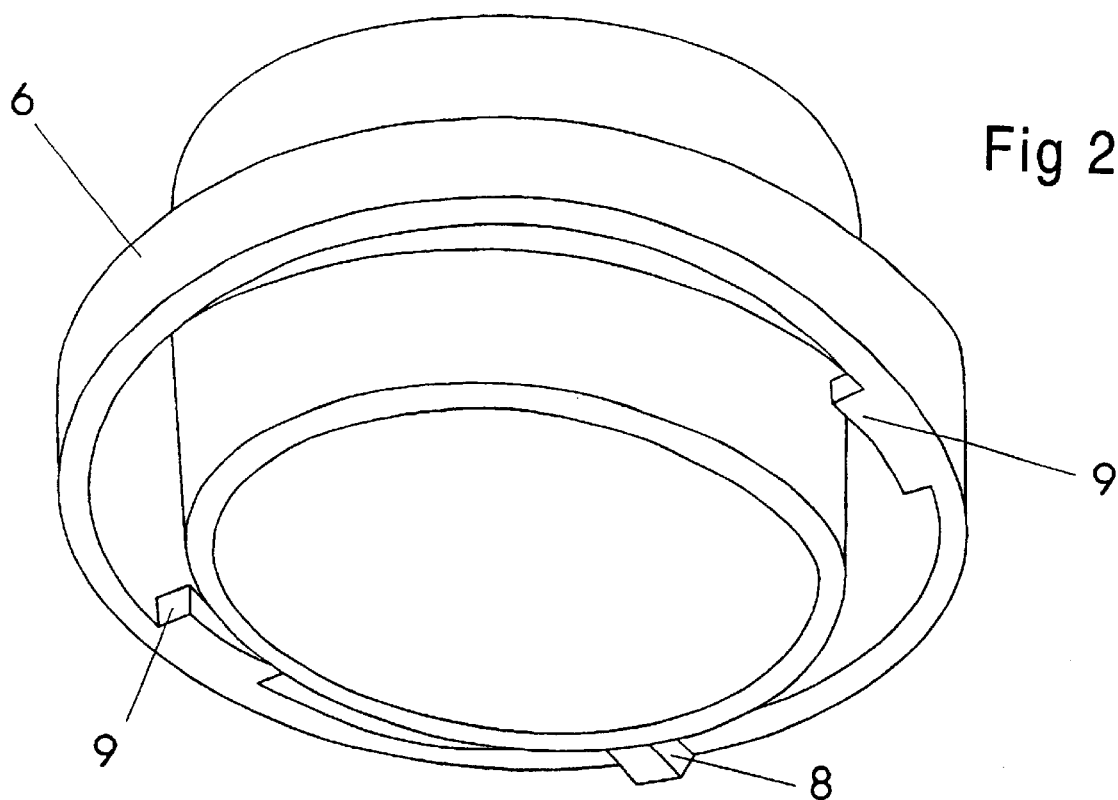
Figure 3:
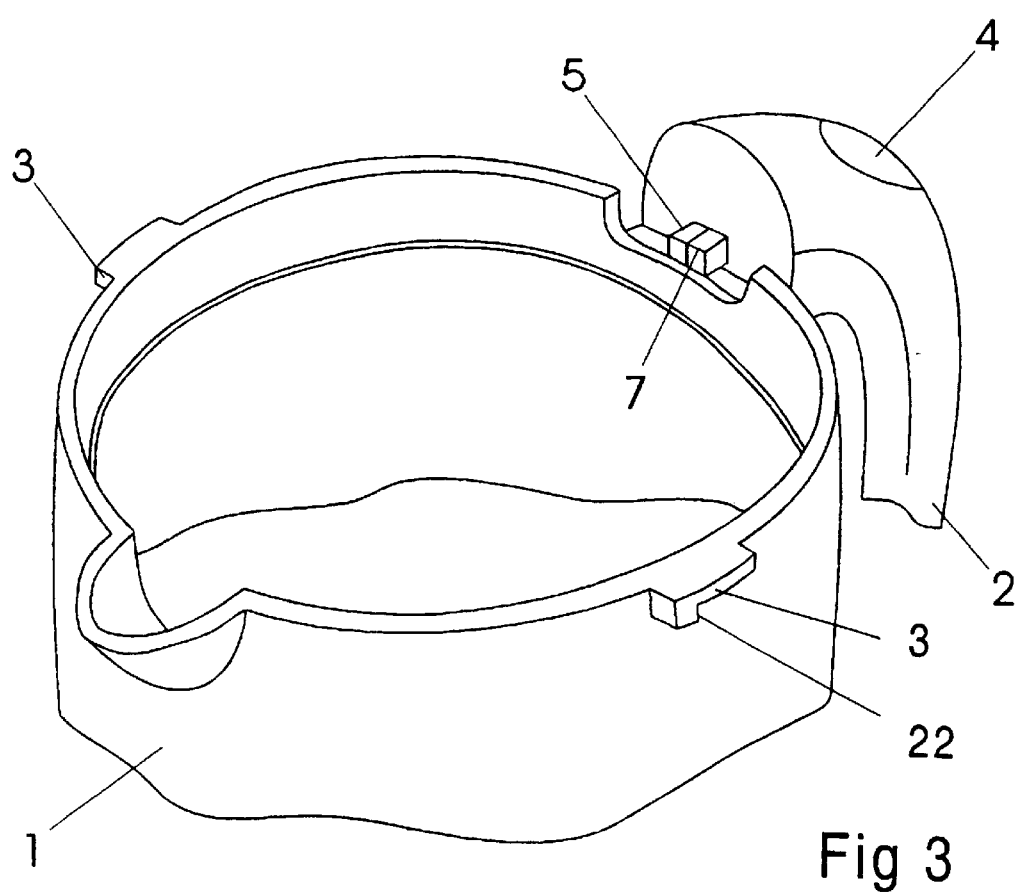

FIGS. 2 and 3 shows that the edge of the container 1 has two diametrically opposed stoppers 3. Each stopper 3 projects outwardly and has a downward projecting stop 22. The stoppers 3 serve as guide to two diametrically opposed horizontal inwardly projecting edges 9 of the lid 6. The two projecting edges 9 fit in the lower part of the stoppers 3, which serve as a course and an end of run for the projecting edges 9. The stops 22 of the stoppers 3 determine the end of the run, thus limiting the angular movement of the lid 6, also preventing the lid 6 from being vertically removed when in the "locked" position.

At the end of the handle 2, there is a lock 5 integrated to the structure of the button 4, so as to lock the movement of the lid 6, when it has been placed on the container 1 and turned until the end of its run, in the "locked" position. Parallel to the lock 5 there is an activator 7 in an integrated canal of the container 1. The activator 7 is able to press the contact pin 16 so that the pin 16 acts on the electric motor safety switch 17.

Figure 4:
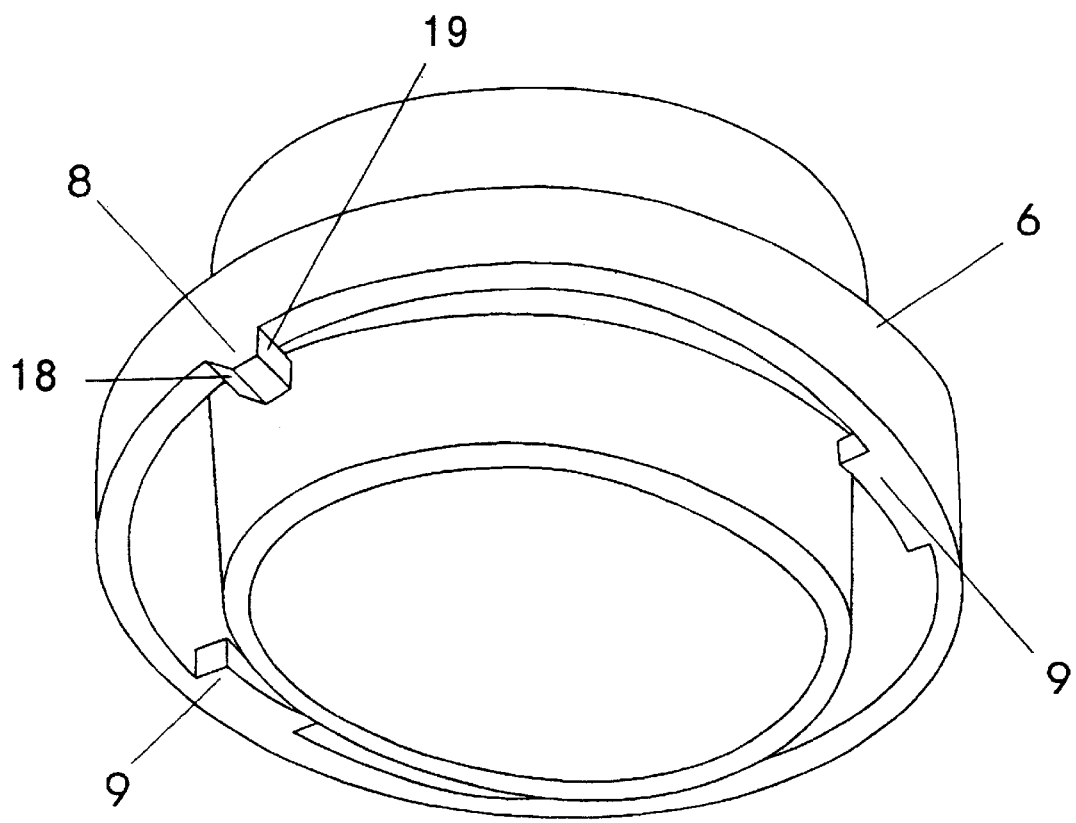

As better seen on FIG. 4, the lid 6 has a lug 8 with a trapezoidal shape, that activates the safety system, acting on the lock 5 and the activator 7. The lug 8 has a slanted actuating edge 18 and a vertical locking edge 19.

Figure 6:
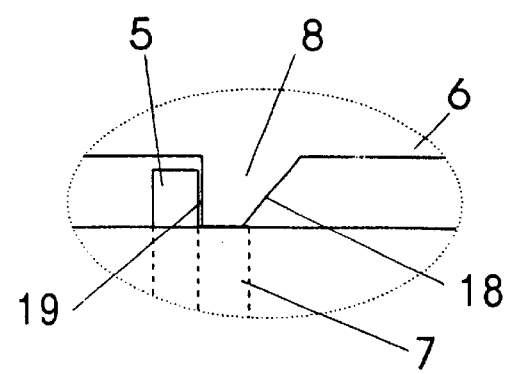
Figure 9:
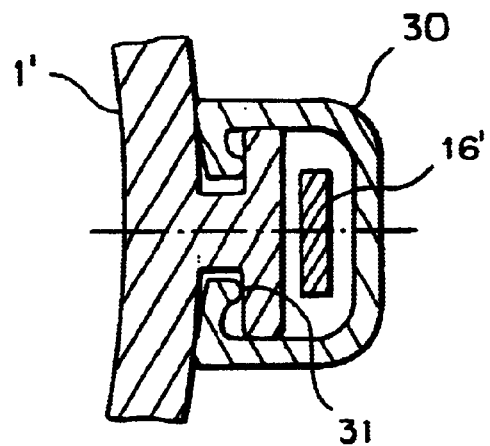
FIG. 9 is an upper sectional view of the handle of the cup shown at FIG. 7.

When the lid 6 is placed on the container 1 and is turned in the direction to cover the container 1, the slanted edge 18 of the lug 8 meets the lock 5, so the lock 5 is pressed by the slanted edge 18 of the lug 8, until it is completely overlapped by the lug 8. Then the lug 8 acts on the activator 7 pressing it until they overlap. At this moment the lid 6 reaches the end of the run, since the projecting edges 9 are fixed in the stoppers 3. Then the lock 5 is released and returns to its original position, as shown in FIG. 6, by the spring 10, so that the lid 6 cannot be turned in the unlocking direction since the lock 5 is opposite to the vertical locking edge 19 of the lug 8 and will bear against the locking edge 19 forming an abutment. In this position, the activator 7 presses the pin 16 which acts on the electric motor safety switch 17, closing the circuit and allowing the apparatus to work.

Figure 5:
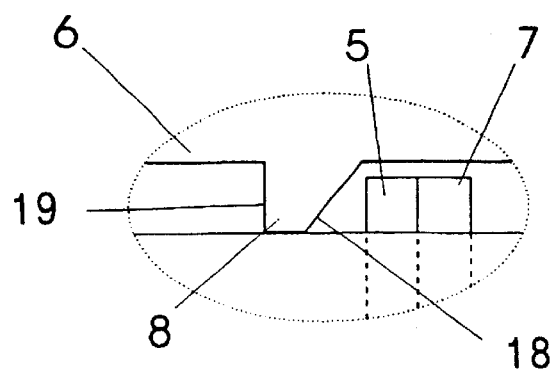

To release the lid 6, the user must press the button 4 vertically, in order to retract the lock 5, and then turning the lid 6 in its unlocking direction and simultaneously removing it. At the moment that the button 4 is pressed, the lock 5 descends and is again introduced into an integrated canal of the container 1, thus the lid 6 is turned overlapping the lug 8 on the lock 5 once more. In this way, the lug 8 releases the activator 7, which returns to its original position, as shown in FIG. 5, because of the spring 11. The activator 7 turns the apparatus off, since the pin 16 stops acting on the electric motor safety switch 17. Then the angular movement of the lid 6 is completed in its unlocking direction, until the projecting edges 9 of the lid 6 are separated from the stoppers 3, thus totally releasing the lid 6.

The release of the lid 6 only occurs when the button 4 is pressed vertically by the user, allowing the lock 5, which is a component of the button 4, to move vertically downwards, thus releasing the angular movement of the lid 6, in the opposite direction of its locking.

Another embodiment of the invention is shown at FIGS. 7 to 10. According to FIG. 7 and 9, the pin 16' is provided in an canal formed by a cover 30 fitted on a vertical rib 31 provided on the outer lateral wall of the container 1'. The upper end of the handle 2' is fixed to the container 1'. The handle 2' comprises a part 14' formed integral with the container 1' and a cover 15' secured to said part to form a hollow body.

According to FIG. 7 the lid 6' blocked in the correct position is seen with the apparatus electric motor already working, activated by the lowering of the pin 16'. A guide pin 32 is fitted on the upper end of the pin 16' mounted against the spring 11'. The button 4' is mounted against the spring 10' on the top of the handle 2'.

Figure 10:
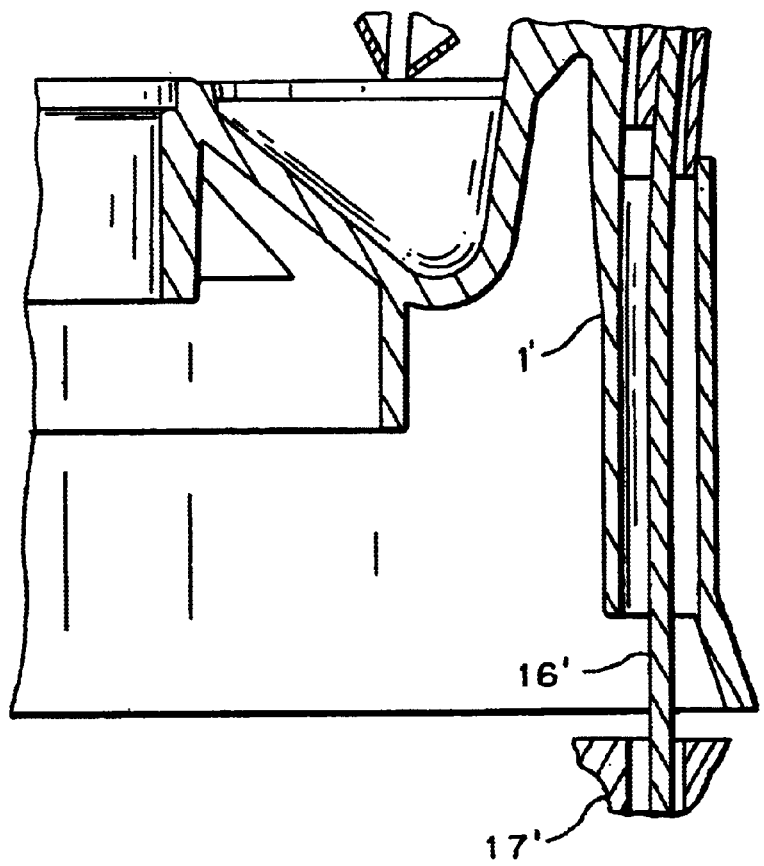
FIG. 10 is a side sectional view of the lower part of the cup shown at FIG. 7.

FIG. 10 shows the lower part of the container 1' with the pin 16' and the safety switch 17' mounted on the motor base.

In order to assemble the lid 6' and simultaneously turn on the apparatus motor safety switch 17', the following steps are carried out:

The internal ring 33 of the lid 6' is introduced inside the container or cup 1' and the lid is turned until it attains the "locked" position. A small rib 12 existing on the button 4' enters a groove or notch 13 on the lid, avoiding it turning, as better seen on FIG. 8.

When the lid 6 surpasses the difference in level (h) it moves the pin guide 32, pressing the pin spring 11', thus forcing the pin 16' to go down and turn on the motor safety switch 17' of the apparatus, which only then can operate. The above mentioned lid 6' kept inserted in the container 1' and turned, moves in an angle until it locks. In this condition it is impossible to turn the lid 6' without activating the button 4'.

In order to withdraw the lid 6', the unlocking is attained by pressing the button 4' and turning the above mentioned lid 6' in the opposite way, i.e., opposite to that used during the assembly.

Having described some preferred examples, it must be understood that the scope of the present invention covers other possible variations, only being limited by the content of the claims attached, where possible equivalents are included.

What is claimed is:

1. An electrical culinary appliance constituted by a blender or food processor, said appliance comprising:
    a base including an electric motor;
    a container constructed to be removably secured on said base, said container having a bottom, a cylindrical open top and a handle, said handle having an upper part;
    a food processing tool mounted in the bottom of said container and having coupling means for coupling said tool to said motor to allow said tool to be driven by said motor;
    a lid for closing said open top of said container, said lid being moveable into a closed operating position relative to said container;
    means for limiting axial movement of said lid relative to said container;
    means for limiting rotational movement of said lid relative to said container; and
    a safety device including a pin mounted on said container and a switch mounted on said base, wherein:
        said lid includes means for actuating said pin to operate said switch in order to enable motor operation when said lid occupies the closed operating position relative to said container, and
        said appliance further comprises a locking button mounted on said container for movement in a direction to actuate a lock, or to bear against an abutment provided on said lid, or to enter a notch provided on said lid to lock said lid on said container in the closed operating position.

2. The electrical appliance according to claim 1 wherein said button is mounted on said handle.

3. The electrical appliance according to claim 2, wherein said button is mounted on said upper part of said handle.

4. The electrical appliance according to claim 3, wherein said button is mounted for vertical movement.

5. The electrical appliance according to claim 2, wherein said button is mounted for vertical movement.

6. The electrical appliance according to claim 1, wherein said button is mounted for vertical movement.

7. The electrical appliance according to claim 1, further comprising a first return spring against which said lock is moveable.

8. The electrical appliance according to claim 1, further comprising a second return spring against which said pin is moveable.

9. The electrical appliance according to claim 1, wherein said lid comprises projecting edges, said container comprises corresponding edges into which said projecting edges fit when said lid is in the closed operating position relative to said container, and said appliance further comprises stops on at least one of said lid and said container for defining a stop position between said projecting edges and said corresponding edges.

10. The electrical appliance according to claim 1, wherein said lid and said container comprise screw threading means.

11. Electrical appliance according to claim 1, wherein said means for actuating said pin comprise a slanted actuating edge able to depress an actuator of said pin during closing of said lid, and a locking edge disposed for bearing against the lock when said lid occupies the closed operating position relative to said container.

12. Electrical appliance according to claim 1, further comprising:
- a first return spring against which said lock is moveable; and
- a second return spring against which said pin is moveable, wherein:
    - said lid comprises projecting edges, said container comprises corresponding edges into which said projecting edges fit when said lid is in the closed operating position relative to said container, and said appliance further comprises stops on at least one of said lid and said container for defining a stop position between said projecting edges and said corresponding edges,
    - said lid and said container comprise screw threading means, and
    - said means for actuating said pin comprise a slanted actuating edge able to depress an actuator of said pin during closing of said lid, and a locking edge disposed for bearing against the lock when said lid occupies the closed operating position relative to said container.

* * * * *